United States Patent [19]

Harada et al.

[11] Patent Number: 5,604,848
[45] Date of Patent: Feb. 18, 1997

[54] VIEWPOINT SETTING APPARATUS FOR A COMPUTER GRAPHICS SYSTEM FOR DISPLAYING THREE-DIMENSIONAL MODELS

[75] Inventors: Hiroaki Harada; Tatsuro Aoyama, both of Kawasaki, Japan

[73] Assignee: Fujitsu Limited, Kawasaki, Japan

[21] Appl. No.: 399,540

[22] Filed: Mar. 7, 1995

[30] Foreign Application Priority Data

Mar. 18, 1994 [JP] Japan .................................. 6-048675

[51] Int. Cl.$^6$ ............................................. G06T 15/00
[52] U.S. Cl. .............................................................. 395/119
[58] Field of Search .................... 395/118–20; 434/30–32

[56] References Cited

U.S. PATENT DOCUMENTS

| | | | |
|---|---|---|---|
| 4,308,015 | 12/1981 | Tye | 434/15 |
| 5,364,271 | 11/1994 | Aknin et al. | 434/61 |
| 5,388,990 | 2/1995 | Beckman | 434/38 |
| 5,456,604 | 10/1995 | Olmsted et al. | 434/62 |

OTHER PUBLICATIONS

McClelland, Deke "Graphics software: Specular International's Infini–D version 2.5.1, and Strata's StrataVision 3d version 2.6.3", *Macworld* Feb. 1994 v11 n2 p. 61(2), Feb. 1994.
Male, Mel, "Get physical with Working Model's accurate MOTION simulation app: users control physical properties, movements, geometry of objects", *MacWEEK* Jul. 19 1993 vol. 7 n29 p. 53(2).
Streeter, Apr., "Working Model knows physics of 2–D images", *MacWeek* Apr. 19 1993 v7 n16 p. 26(1).
Shepard, Steve, "Interactive Physics II; Knowledge Revolution's simulation tool breathes life into high–school and college physics experiments", *MacUser* Dec. 1992 v 8 n12 p. 70(1).
Shaw, Julie, "Virtual reality resource guide", *AI Expert*, v8, n8, p. 34(10), Aug. 1993.
Robertson, Barbara, "Easy motion", *Computer Graphics World*, v16, n12, p. 33(5), Dec., 1993.
Millman, Joel, "Artistic programming", *Forbes*, v151, n7, p. 94(2), Mar. 29, 1993.
Forcade, Tim, "Engineering visualization", *Computer Graphics World*, v15, n11, p. 37(5), Nov., 1992.
Tucker, Carole S. MS et al., "Three Dimensional Animation of Kinematic Data", *Bioengineering*, 1993 Conference 18th annual Northwest, pp. 140–150.

*Primary Examiner*—Almis R. Jankus
*Assistant Examiner*—Rudolph Buchel
*Attorney, Agent, or Firm*—Staas & Halsey

[57] ABSTRACT

A viewpoint setting apparatus for setting a viewpoint, provided by a three-dimensional model, on a display monitor in a computer graphics system which includes: a model information database for storing three-dimensional model information including model coordinates and physical attributes thereof; a viewpoint locus database for storing viewpoint information including locus data produced when the viewpoint moves on the display monitor; a field of view conversion matrix database for storing a three-dimensional conversion matrix in order to change a field of view from the viewpoint; a motion calculation unit for receiving the model information and the viewpoint information, calculating the motion of the model caused by a change of the field of view based on change of the viewpoint which is caused by physical forces applied to the model having the viewpoint, and sequentially updating the field of view conversion matrix database in accordance with change of the field of view calculated; a drawing processing unit for receiving the result of the calculation of the field of view conversion matrix from the motion calculation unit, and drawing the three-dimensional model on the display monitor based on new field of view calculated by the motion calculation unit; and an input unit for outputting a view-parameter which adjusts the motion of the model so as to conform to the actual viewpoint of a user.

6 Claims, 10 Drawing Sheets

Fig. 3B

MODEL INFORMATION DATA BASE

MODEL COORDINATE:

| No | x | y | z |
|----|---|---|---|
| ... | ... | ... | ... |

MODEL ATTRIBUTE:

MASS | $m$

COLOR | $col$

REFLECTION RATE | $ref$

Fig. 3A

FIELD OF VIEW DATA BASE

OBJECT | $k$

LOCUS OF VIEWPOINT:

| p0 | x0 | y0 | z0 |
|----|----|----|----|
| p1 | x1 | y1 | z1 |
| ... | ... | ... | ... |
| pn | xn | yn | zn |

VIEW LINE DIRECTION:

| p0 | a0 | b0 | c0 |
|----|----|----|----|
| p1 | a1 | b1 | c1 |
| ... | ... | ... | ... |
| pn | an | bn | cn |

VELOCITY OF VIEWPOINT:

| p0 | Vx0 | Vy0 | Vz0 |
|----|-----|-----|-----|
| p1 | Vx1 | Vy1 | Vz1 |
| ... | ... | ... | ... |
| pn | Vxn | Vyn | Vzn |

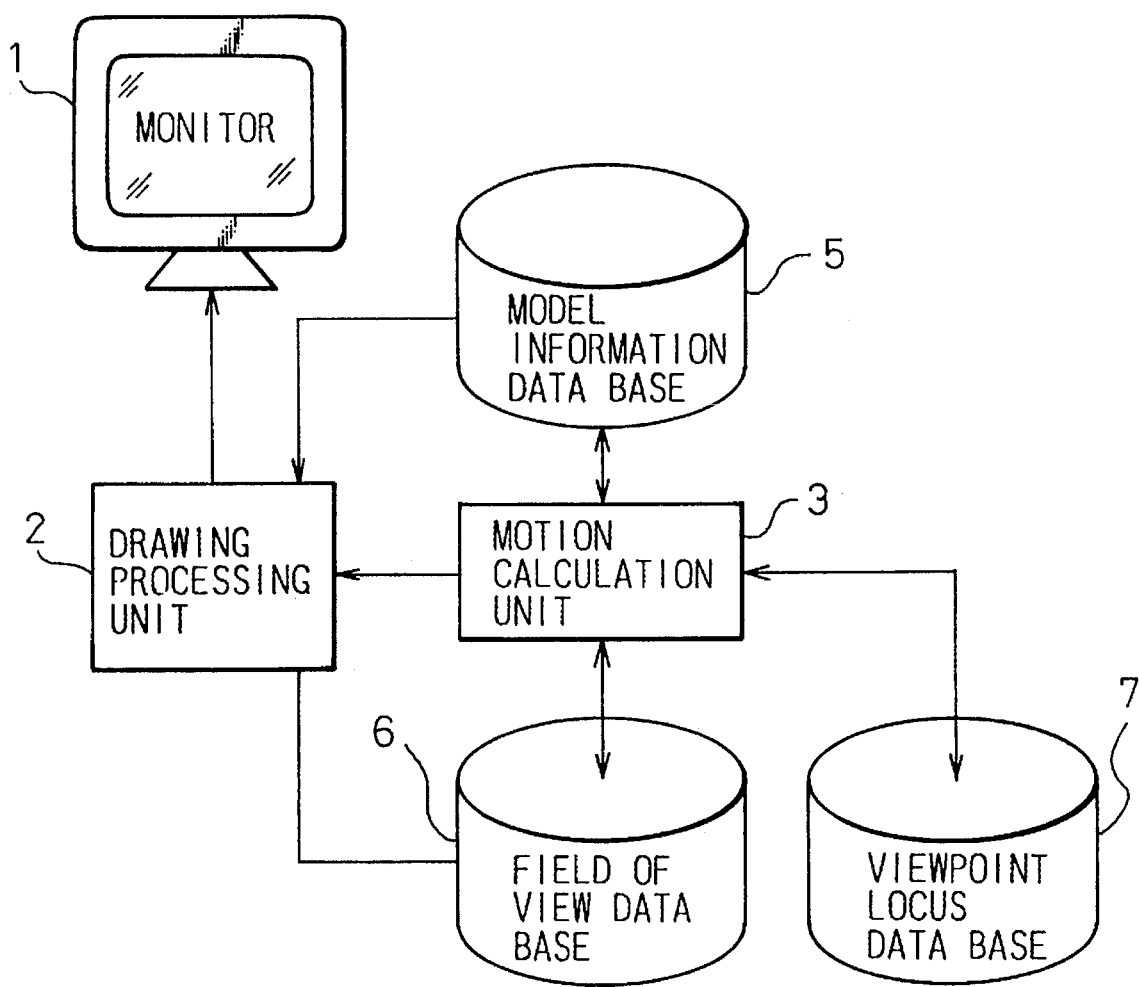

VIEWPOINT SETTING APPARATUS FOR A COMPUTER GRAPHICS SYSTEM FOR DISPLAYING THREE-DIMENSIONAL MODELS

BACKGROUND OF THE INVENTION

1. Field of the Invention

The present invention relates to a viewpoint setting apparatus for setting a viewpoint, provided by a three-dimensional model, on a display monitor for a computer graphics system. Particularly, it relates to a viewpoint setting apparatus which can set the direction of the viewpoint from the model by taking into account physical forces which may be applied to an actual model in an actual environment. According to the present invention, it is possible to realize a computer graphic very close to an actual view on the display monitor. The present invention is advantageous when producing an animated image using computer graphics.

2. Description of the Related Art

Computer graphic systems are widely utilized in various fields, for example, in television game systems, in education systems, in CAD systems, etc. For example, in television game systems, almost all images are formed as animated images, and each motion of the model is close to an actual motion in real time in an actual environment. In general, this technique is called "virtual reality". However, the motion of the model on the computer graphics is not very close to the actual motion because various physical forces which may be applied to the actual model in the actual environment are not taken into account in the calculation of the computer graphic.

Accordingly, the present invention improves the virtual reality technique and realizes a computer graphic which is very close to an image of an actual motion by setting a direction of the viewpoint on the model (i.e., viewline from the model) based on a calculation, which takes into account physical forces, for example, centrifugal force, reaction force, gravity, etc.

SUMMARY OF THE INVENTION

The object of the present invention is to provide a viewpoint setting apparatus which can draw a computer graphic on a display, which is very close to the image of an actual motion in an actual environment.

In accordance with the present invention, there is provided a viewpoint setting apparatus, for setting a viewpoint provided on a three-dimensional model on a display monitor for a computer graphic system, including: a model information database for storing three-dimensional model information including the model coordinates and the physical attributes thereof; a viewpoint locus database for storing viewpoint information, including locus data produced when the viewpoint moves, on the display monitor; a field of view conversion matrix database for storing three-dimensional conversion matrix in order to change a field of view from the viewpoint; a motion calculation unit operatively connected to the model information database, the viewpoint locus database, and the field of view conversion matrix database, for receiving the model information and the viewpoint information, calculating the motion of the model caused by change of the field of view based on a change of the viewpoint which is caused by physical forces applied to the model having the viewpoint, and sequentially updating the field of view conversion matrix database in accordance with change in the calculated field of view; a drawing processing unit operatively connected to the motion calculation unit, for receiving the result of the calculation of the field of view conversion matrix from the motion calculation unit, and drawing the three-dimensional model on the display monitor based on new field of view calculated by the motion calculation unit; and an input unit operatively connected to the motion calculation unit for outputting a view-parameter which adjusts the motion of the model so as to adapt to the actual viewpoint of a user.

In one preferred embodiment, the motion calculation unit calculates a composite force, applied to the model, of the physical forces which are defined by centrifugal force, gravity, and a reactive force in order to calculate a change in the field of view.

In another preferred embodiment, the motion calculation unit does not calculate the motion of the model when the viewpoint is not provided on the model.

In still another preferred embodiment, the field of view conversion matrix database includes two types of field of view conversion matrixes, i.e., one which includes no influence from the physical forces, and the other which includes the influence from the physical forces, the change of field of view being calculated based on the former matrix, and the matrix being corrected based on the influence of the physical forces in the latter matrix.

In still another preferred embodiment, the view-parameter further adjusts the slant of the model so as to obtain a visually preferable viewpoint in accordance with a change in the field of view.

In still another preferred embodiment, the view-parameter is determined by a user by observing the three-dimensional model displayed on the monitor.

In still another preferred embodiment, the three-dimensional model is formed by a bar-shaped model having a mass at the end thereof and a viewpoint at the top thereof.

BRIEF DESCRIPTION OF THE DRAWINGS

FIGS. 3A and 3B show one example of the contents stored in a field of view information database and a model information database;

FIG. 10 is a basic block diagram of a conventional viewpoint setting apparatus;

DESCRIPTION OF THE PREFERRED EMBODIMENTS

Figure 7:
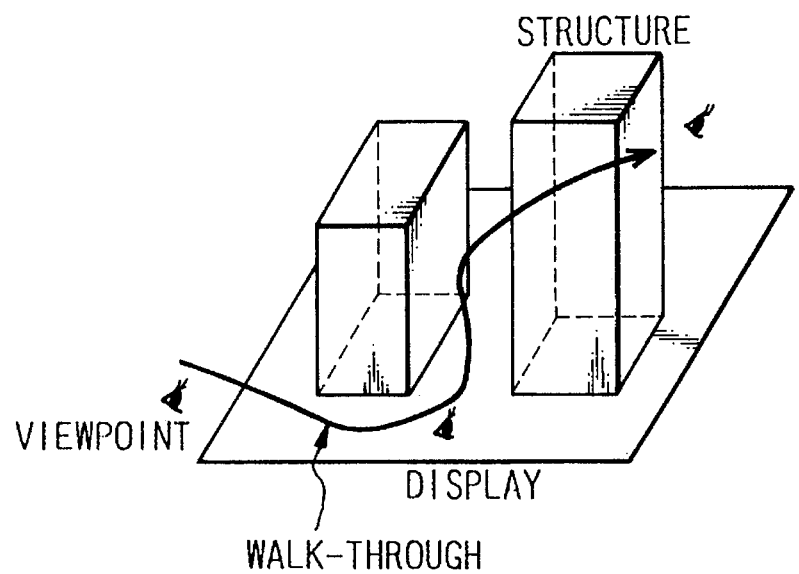
FIG. 7 is an explanatory view for explaining a walk-through of a viewpoint in a computer graphic.

FIG. 7 is an explanatory view for explaining a walk-through of a viewpoint in a computer graphic. In a computer graphic, a user can observe a virtual model world (i.e., a stereo graphic environment drawn on the display monitor) by changing a viewpoint. This technique is called "virtual reality" and is utilized in various fields, for example, TV games and education and CAD systems. In this case, as is obvious, the viewpoint is not an actual viewpoint in the actual environment of the user, and this viewpoint is based on the virtual environment in the computer graphic.

As shown in FIG. 7, two structures (graphics) are drawn on the display, and the viewpoint is moved on the display passing through two structures as shown by a curved solid line. Further, the term "walk-through" is defined as the locus of the moving viewpoint on the computer graphics.

Figure 8:
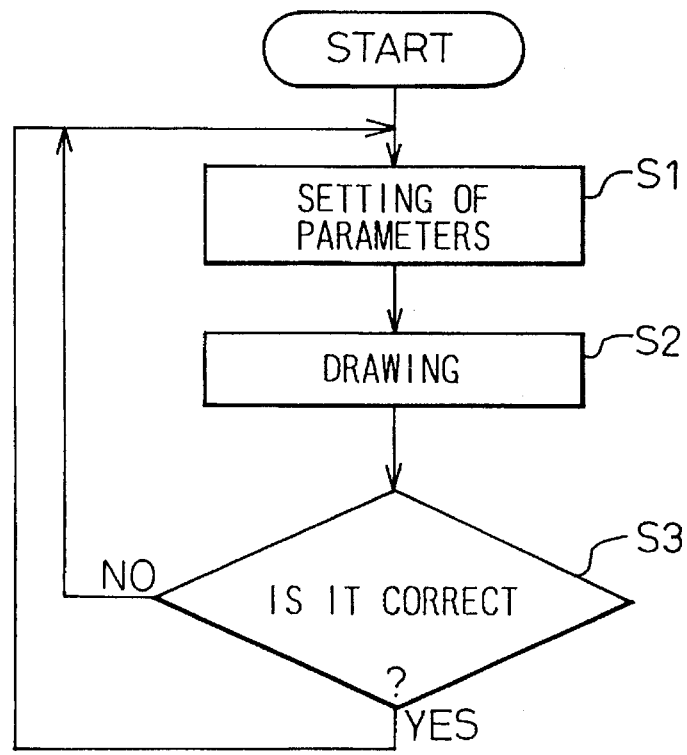
FIG. 8 is a basic flowchart for generating a walk-through in a conventional art.

FIG. 8 is a basic flowchart for generating a walk-through in a conventional art. In a conventional walk-through technique, so-called "try-and-fail" method is employed for setting the location of the viewpoint and the moving direction thereof. According to the try-and-fail method, first, various physical parameters, for example the coordinates of the viewpoint, are set in a drawing processing unit (see, FIG. 9) (step S1), next, each parameter is sequentially drawn on the display after predetermined calculation in a motion calculation unit (see, FIG. 8).

Next, the parameter is checked visually by the user in order to confirm whether the parameter is correct or not (step S2) regarding the location of the viewpoint. Further, these processes are repeated for all parameters (step S3). After all parameters are checked, the walk-through route is established so that the viewpoint reaches a target point.

As is obvious from the above explanation, the longer the walk-through route is, the more parameters are necessary so that considerable time is required to calculate and determine the walk-through route.

Still further, in a conventional computer graphics, when generating the walk-through route, it is very difficult to take into account various physical forces, for example, friction forces, centrifugal force, gravity, reactive forces, etc., that are applied to the three-dimensional model. If these parameters can easily employ into the walk-through route, the viewpoint of the walk-through may be close to the actual viewpoint of the user.

Figure 9:
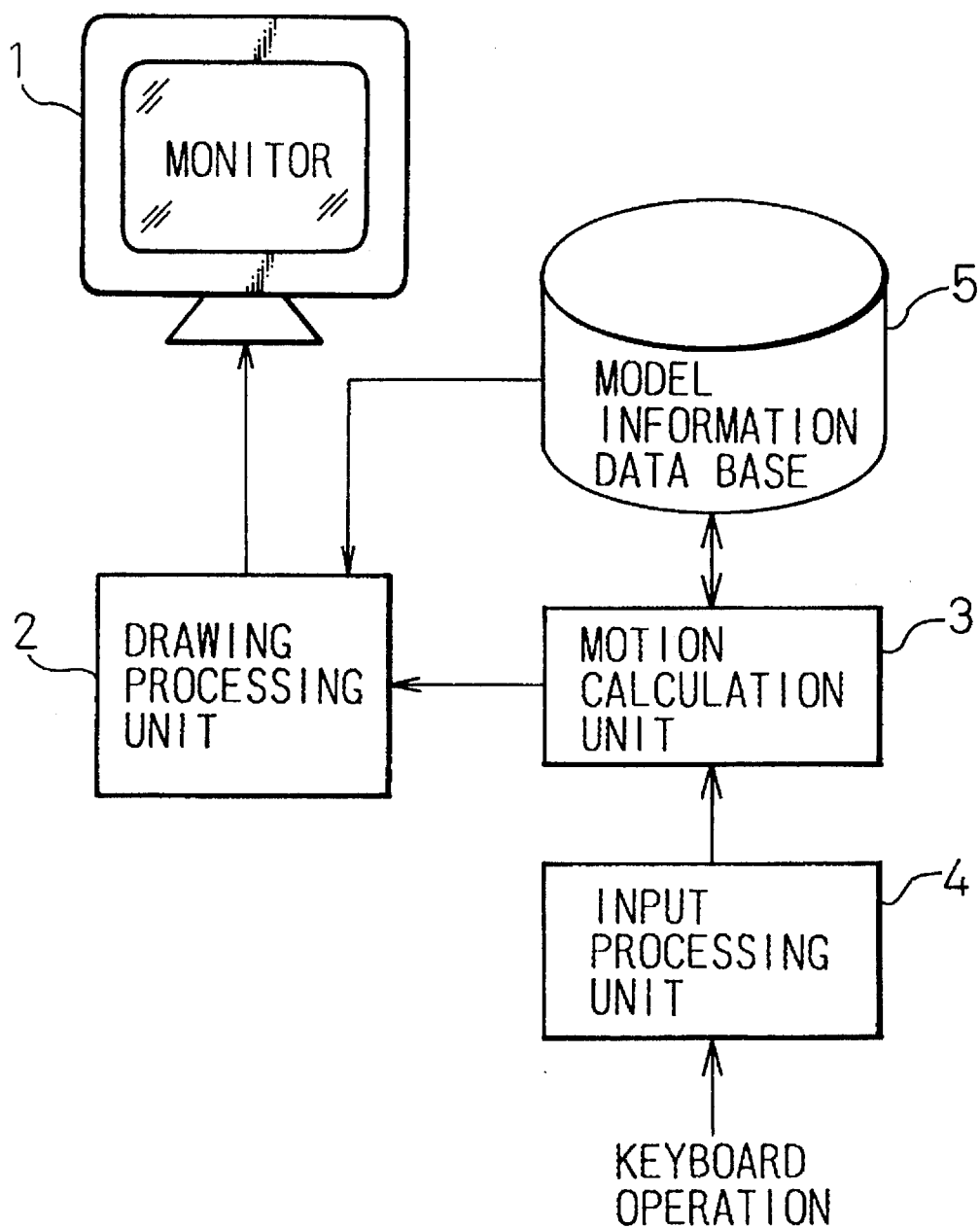
FIG. 9 is a basic block diagram of a flight simulator in a conventional art.

FIG. 9 is a basic block diagram of a flight simulator in a conventional art. Recently, computer graphics are widely utilized in flight simulators. In FIG. 9, reference number 1 denotes a monitor, 2 denotes a drawing processing unit, 3 denotes a motion calculation unit, 4 denotes an input processing unit, and 5 a model information database.

When inputting various parameters to the input processing unit 4 through a keyboard, the motion calculation unit 3 calculates the viewpoint of the walk-through route. In this case, the motion of the model is defined by various physical forces, for example, centrifugal force, gravity, etc., applied to the model. Reference number 5 denotes a model information database for storing model information including, for example, the three-dimensional coordinates of the model.

The main purpose of the flight simulator is to reflect an actual movement of the model in real time, and the user practices an actual operation through the graphics. Accordingly, in general, since the viewpoint information is not provided in the flight simulator, it is difficult to hold the information of the same route and to repeatedly draw the same by changing the physical parameters. For example, it is very difficult to check the change of field of view on a roller coaster (i.e., the walk-through route is fixed) on a playground by changing the weight parameter of a vehicle which is provided on the roller coaster.

FIG. 10 is a basic block diagram of a conventional viewpoint setting apparatus. As is obvious from the drawing, a field of view database 6 and a viewpoint locus database 7 are additionally provided to the structure of FIG. 9. The monitor 1 and the drawing processing unit 2 are the same as those in FIG. 9.

The model data and the viewpoint locus information are previously stored in the corresponding databases 5 and 7. The motion calculation unit 3 calculates the operation of the model based on a known physical rule, and generates the field of view conversion matrix.

Figure 11A:
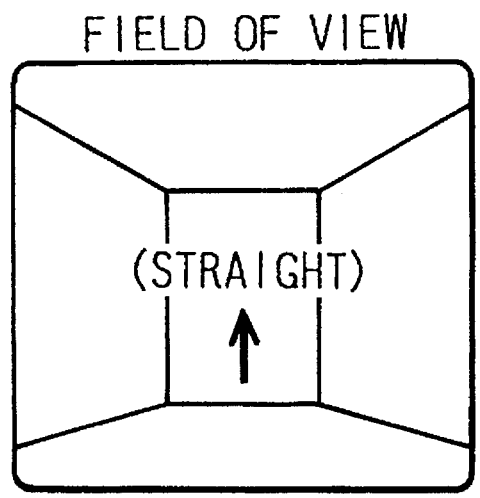
FIGS. 11A and 11B are explanatory views for explaining slant of a field of view.
Figure 11B:
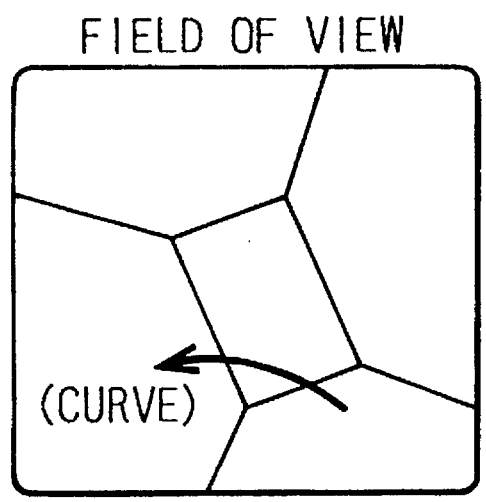

FIGS. 11A and 11B are explanatory views for explaining the slant of a field of view. FIG. 11A shows the change in the field of view in the case of straight walk-through route, and FIG. 11B shows the change of the field of view in the case of a curved walk-through route. For example, it is assumed that the viewpoint is set on a vehicle. In this case, external forces, such as centrifugal force, gravity, reactive force, etc., are applied to the vehicle in actual operation. Accordingly, in FIG. 11B, the field of view further changes when the external forces are applied compared to the case when no external forces are applied.

Figure 12:
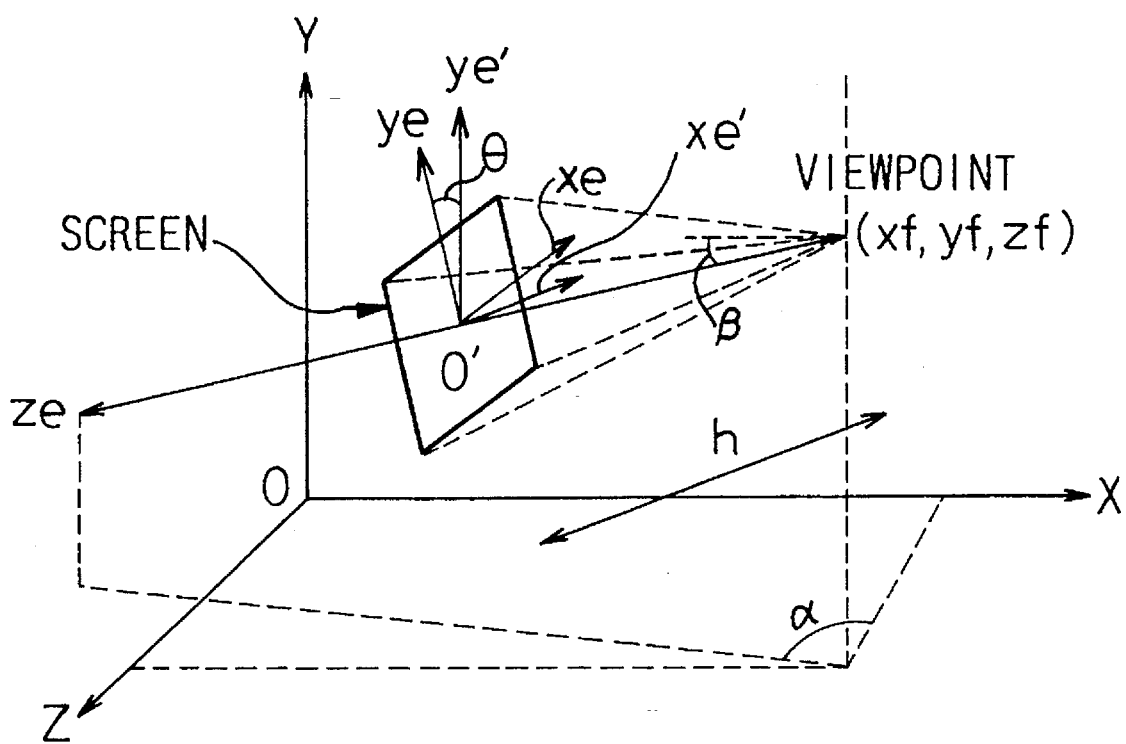
FIG. 12 is an explanatory view for explaining coordinate conversion of the field of view.

FIG. 12 is an explanatory view for explaining coordinate conversion of a field of view. In FIG. 12, the coordinate of the viewpoint is expressed by the coordinate (xf,yf,zf) on a model coordinate (X-Y-Z). The screen is provided on the two-dimensional plane (xe,ye) on the coordinate (xe,ye,ze) displayed on the monitor. The coordinate (xe',ye') is given by rotating the coordinate (xe,ye) through an angle θ about the axis (ze) in order to correct the coordinate. Further, "h" denotes a distance from the viewpoint to the screen.

The angles α and β are rotational angles of the viewpoint on the model coordinate (X-Y-Z). That is, the direction of the viewpoint is provided on the axis (ze), and rotated by the angle α around the axis Y and rotated by the angle β around the axis X.

The following formulas (1) to (3) are one example of the field of view conversion matrix.

$$\begin{bmatrix} xx \\ yy \\ zz \\ 1 \end{bmatrix} = \begin{bmatrix} \cos\alpha & 0 & \sin\alpha - & xy \cdot \cos\alpha - zf \cdot \sin\alpha \\ \sin\alpha \cdot \sin\beta & \cos\beta - & \cos\alpha \cdot \sin\beta - & xf \cdot \sin\alpha \cdot \sin\beta - yf \cdot \cos\beta + zf \cdot \cos\alpha \cdot \cos\beta \\ \sin\alpha \cdot \cos\beta - & \sin\beta - & \cos\alpha \cdot \cos\beta - & xf \cdot \sin\alpha \cdot \cos\beta - yf \cdot \sin\beta + zf \cdot \cos\alpha \cdot \cos\beta \\ 0 & 0 & 0 & 1 \end{bmatrix} \begin{bmatrix} x \\ y \\ z \\ 1 \end{bmatrix} \quad (1)$$

$$\begin{cases} xe = h \cdot \dfrac{xx}{zz} \\ ye = h \cdot \dfrac{yy}{zz} \\ ze = 2h - \dfrac{h^2}{zz} \end{cases} \quad (2)$$

$$\begin{bmatrix} xe' \\ ye' \\ ze' \\ 1 \end{bmatrix} = \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix} \begin{bmatrix} xe \\ ye \\ ze \\ 1 \end{bmatrix} \quad (3)$$

As shown by above formulas, when the coordinates of the viewpoint are expressed by the coordinates (xf,yf,zf), the coordinates on the screen (xe,ye,ze) are given by two formulas (1) and (2). That is, the matrix (xx,yy,zz,1) is calculated by the formula (1) and the calculated values are substituted for the values (xx,zz,zz) in the formula (2). As shown by the formula (1), the field of view conversion matrix is expressed by as a 4×4 matrix.

Further, the screen coordinate (xe,ye,ze) is rotated by the angle θ about the axis (ze) so that the corrected coordinate (xe',ye',ze',1) is given by the formula (3).

The motion calculation unit 3 of FIG. 10 calculates the motion of the model (for example, a vehicle) at the viewpoint after the locus of the viewpoint is determined, executes the coordinate conversion of the field of view in accordance with the formulas (1) to (3), and stores the calculated values into the field of view database 6 of FIG. 10.

The drawing processing unit 2 reads the information of the model from the model information database 5, reads the information of the field of view from the field of view database 6, and executes a change of the field of view in accordance with the calculation by the motion calculation unit 3. The result of the change is displayed on the monitor 1.

However, there are some problems in the above conventional art as explained below.

First, when changing the field of view information, it is necessary to again calculate the field of view conversion matrix and to update the field of view information database. That is, it is necessary to calculates again the field of view when changing a physical attribute, for example, the mass of the model, on the fixed viewpoint locus. Accordingly, the amount of calculation for the motion of the model becomes very large so that it is very difficult to easily produce a computer graphic.

Second, it is necessary to take into account physical forces which may be applied to an actual model in an actual environment. In a conventional art, such forces are not taken into account in the computer graphics. According to the present invention, it is possible to realize a computer graphic very close to an actual view on the display monitor.

Figure 1A:
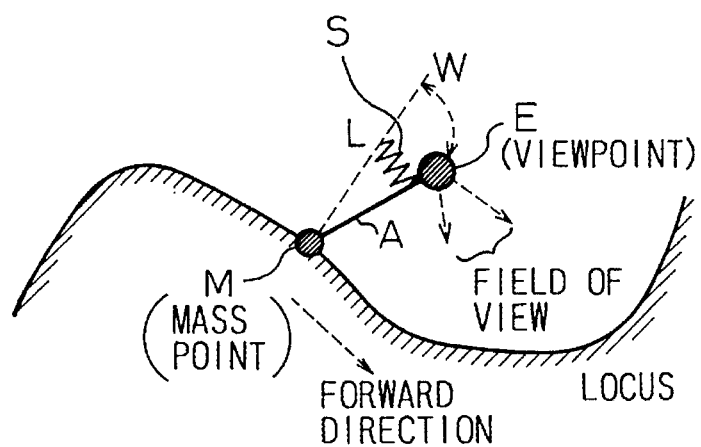
FIGS. 1A to 1C are explanatory views of physical forces applied to a model in a computer graphic.
Figure 1B:
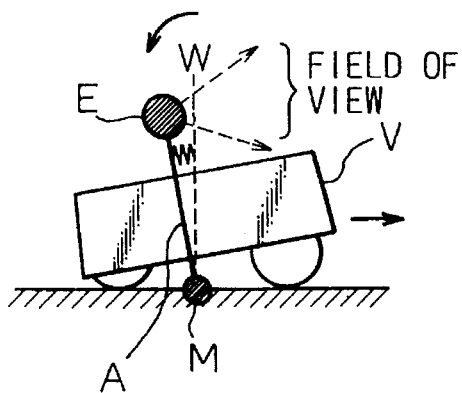
Figure 1C:
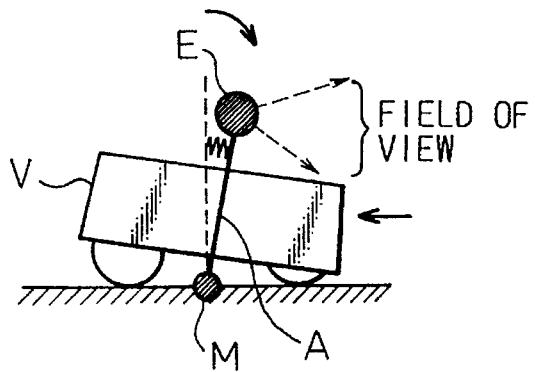

FIGS. 1A to 1C are explanatory views of physical forces applied to a model on computer graphics. In these drawings, "A" denotes a bar-shaped model, "E" denotes a viewpoint, "L" denotes a distance, "M" denotes a mass point, "V" denotes a vehicle, "S" denotes a spring, and "W" denotes a direction.

As shown in the drawings, it is assumed that the viewpoint E is provided on a top of the bar-shaped model A, and corresponds to the eye level of a driver as shown in FIGS. 1B and 1C. The locus of the movement of the model A is previously set. The model A has the mass point M at the end thereof, and moves on the locus in accordance with a predetermined time (velocity). When the model A moves in the direction of the arrow, it is considered that various forces, for example, centrifugal force, are applied thereto so that the field of view from the viewpoint E is changed.

Next, when the model A is moved, the viewpoint is moved in the direction W based on, for example, the influence of the centrifugal force. In this situation, an reactive force is applied to the model A against the centrifugal force. This reactive force is expressed by the reactive force of the spring S in the drawing.

On the other hand, in general, when a force F is applied to the mass point M, it is considered that the location of the viewpoint is changed by displacement "x" proportional to the force F (where, x=F/η, η=a spring constant of the model A).

In FIG. 1B, this case shows the case of quick start of the model. In FIG. 1C, this case shows quick stop of the model. In these drawings, the model A corresponds to the vehicle V. In these cases, the viewpoint E, which corresponds to the eye of the driver, is moved so that the field of view is also changed as shown by the arrows.

Figure 2:
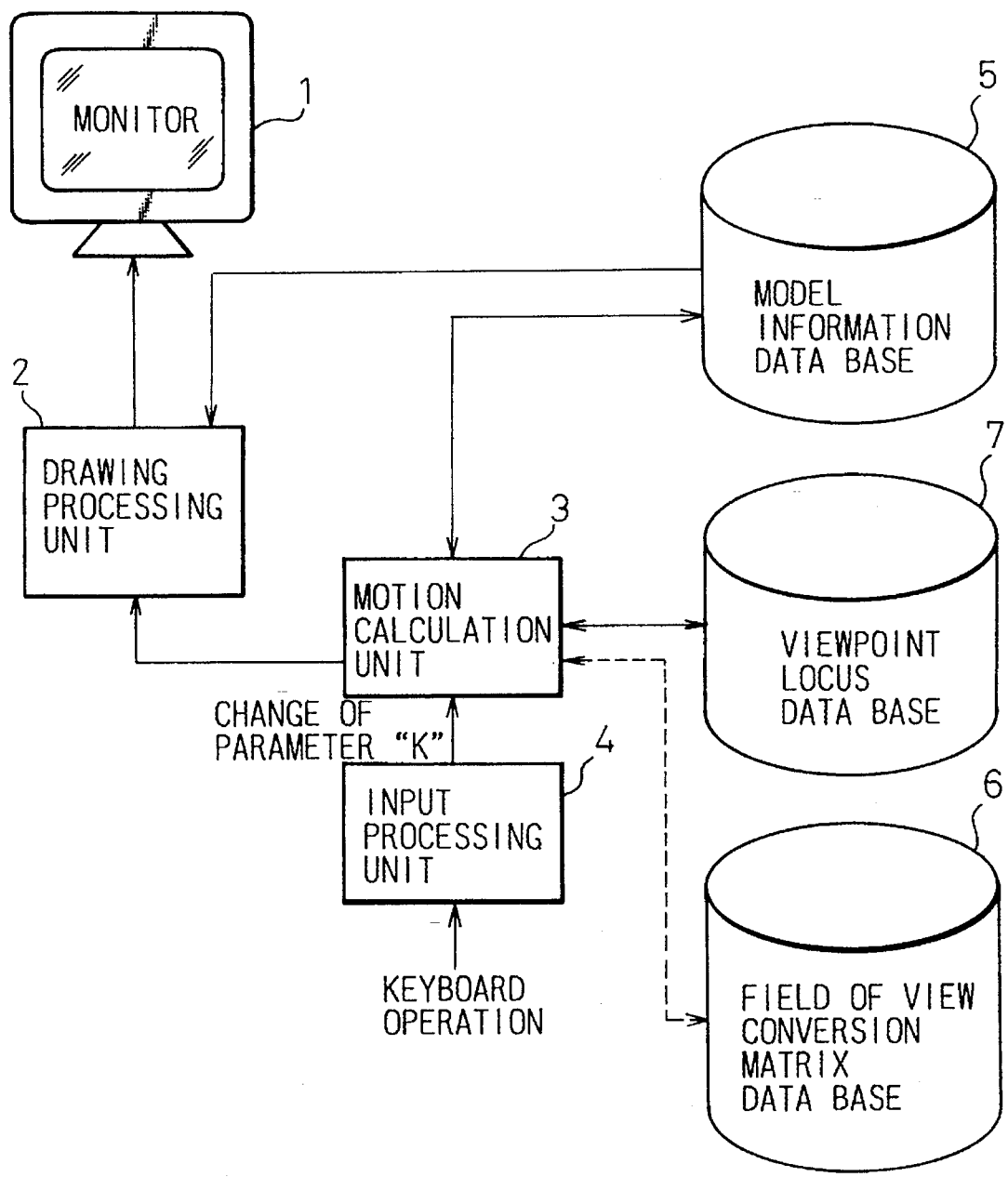
FIG. 2 is a basic block diagram of a viewpoint setting apparatus according to the present invention.

FIG. 2 is a basic block diagram of a viewpoint setting apparatus according to the present invention. Although the model information database 5, the field of view conversion matrix database 6, and the viewpoint locus database 7 are also provided in the present invention, the contents of these databases are different from those of FIG. 10.

The model information database 5 stores various geometric data of the model, for example, shape of model and coordinate thereof, and physical attributes thereof, for example, the mass, etc. Further, database 5 stores movement information of the model, for example, location, velocity, acceleration, etc. The viewpoint locus database 7 stores locus data of the three-dimensional space and viewpoint setting data on the computer graphics.

The motion calculation unit 3 updates the field of view information stored in the model information database 5, and refers to the model information database 5 based on the viewpoint setting data stored in the viewpoint locus database 7. Further, the motion calculation unit 3 reads the physical attributes from the model information database 5, and calculates the centrifugal force, the friction force, the gravity, mutual interference, etc., which are derived from the physical attribute and the viewpoint locus in accordance with known physical rules. Still further, the motion calculation unit 3 calculates the field of view conversion matrix based on above data. These calculations are executed in accordance with a request from the drawing processing unit 2, and it is not necessary to process all the information stored in the model information database in the conventional art.

The drawing processing unit 2 calculates the viewpoint based on the field of view conversion matrix, and displays the result on the monitor 1.

The input unit outputs a view-parameter which adjusts the motion of the model so as to adapt to the actual viewpoint of a user. Further, the view-parameter further adjusts the slant of the model so as to obtain a visually preferable viewpoint in accordance with a change in the field of view. Still further, the view-parameter is determined by a user by observing the three-dimensional model displayed on the monitor.

In the present invention, the field of view conversion matrixes in the case that the influence of the physical forces is very small are previously calculated and stored in the field of view conversion matrix database 6. When drawing the model, only the influence of the physical forces are calculated and corrected in the field of view conversion matrixes. Accordingly, it is possible to quickly draw the model in the computer graphic.

Figure 4:
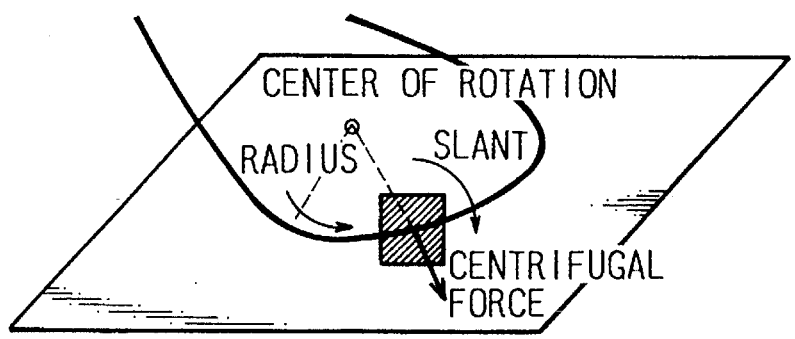
FIG. 4 is an explanatory view for explaining movement of a viewpoint and a slant of the field of view.
Figure 5A:
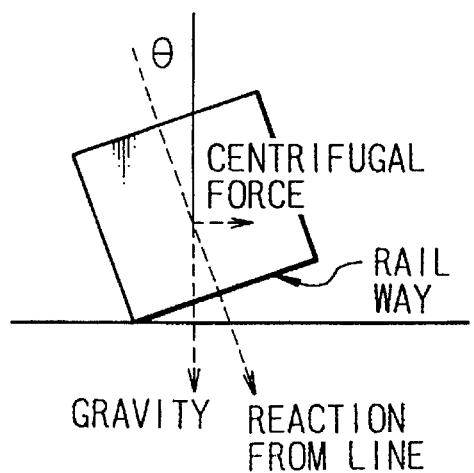
FIGS. 5A and 5B are explanatory views for explaining the slant of the field of view.
Figure 5B:
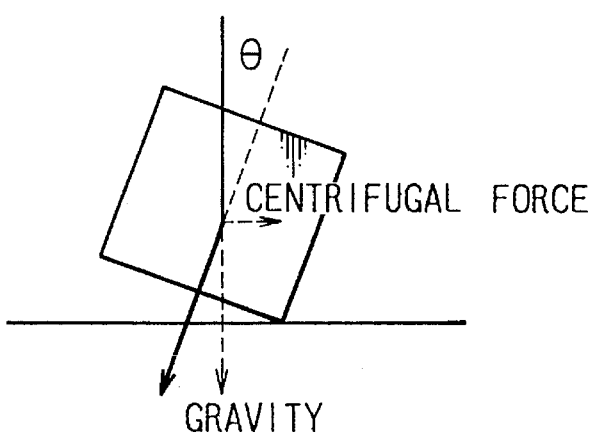

FIGS. 3A and 3B show one example of the contents of the field of view information database 6 (FIG. 3A) and the model information database 5 (FIG. 3B), FIG. 4 is an explanatory view for explaining movement of the viewpoint and the slant of the field of view, and FIGS. 5A and 5B are explanatory views for explaining the slant of the field of view.

As shown in FIG. 3B, the model information of the model number "k" in the model information database is mainly formed by the model coordinates and the model attributes. The model coordinates include the coordinates (x,y,z) of the model number "k", and the model attributes includes the mass "m", the color "col" and the reflection rate "ref" of the model number "k" as the physical attributes. These are representative attributes, which can be easily input by using, for example, a CAD system. Further, the model information includes the information on friction and inertia which are applied to the model. However, these data are omitted in this drawing.

As shown in FIG. 3A, the field of view information is formed by the model, the locus of the viewpoint, the viewing direction and the velocity of the viewpoint. These data are used for setting the locus of the viewpoint on the display. The object which provides the viewpoint is set to the model number "k". If the desired object model is not provided in the model number "k", this viewpoint becomes a virtual point so that physical forces are not applied thereto.

The locus of the object having the viewpoint is stored in the form of the coordinates p(i) (x(i), y(i), z(i)) at the number "i" viewpoint as the locus data of the viewpoint. The vector of the viewing direction is designated in order to determine the direction of view from the viewpoint. This vector is explained in detail below. The direction of view is stored in the form of the coordinates p(i) (a(i), b(i), c(i)) at the number "i" viewpoint. The velocity of the viewpoint is stored in the form of the coordinates p(i) (Vx(i), Vy(i), Vz(i)).

Although the vector of the direction of view can apply to each viewpoint for every position and time, in this embodiment, the vector is applied by the angles α and β as shown in FIG. 12.

Next, the drawing process is explained with reference to FIG. 2. The user instructs the start of the drawing process through the input processing unit 4 as shown in FIG. 2. The drawing processing unit 2 converts the model coordinates of the model to the screen coordinates using the field of view conversion matrix, and draws the result on the display monitor 1 after a known clipping method is applied to the drawing. The field of view conversion matrix is shown by the formula (1). The shape and position of the model at the time "t0" is sent from the model information database 5 to the drawing processing unit 2. The drawing unit 2 prepares the graphics based on the predetermined data. As shown in formula (1), in general, the field of view conversion matrix is formed as a 4×4 matrix.

Next, the motion calculation in the motion calculation unit 3 is explained in detail below.

First, the motion calculation unit 3 reads out the data of the locus of the viewpoint (see, FIG. 3A), for example, the model number which provides the viewpoint and the coordinates of the viewpoint, from the viewpoint locus database 7.

In order to simplify the explanation, in FIGS. 1A to 1C, it is assumed that the bar A is provided in the up-direction from the mass point M on a ground level and the length thereof is very short. Accordingly, only centrifugal force and gravity are applied to the model as physical forces. Further, it is assumed that the fluctuation caused by the centrifugal force and the movement of the viewpoint does not act on the bar A. Still further, it is assumed that the change in the field of view always occurs in a plane normal to the forward direction (see, FIG. 11B).

The motion calculation unit 3 calculates the centrifugal force F(t) and gravity G(t) at the time "t" based on the physical attribute of the model (see, FIG. 3B). A composite force of the centrifugal force F(t) and gravity G(t) is applied to the model. Gravity G(t) applied to the model (k) is given by the formula "m(k) * g" based on the physical attribute of the model (k).

The centrifugal force F(t) is "0" at an initial time. The centrifugal force F(t) at the time "t" is calculated based on the position of the viewpoint at the time "t-2", "t-1" and "t" as follows In this case, the positions of the viewpoint at the time "t-2", "t-1" and "t" are given by the coordinates (x1,y1,z1), (x2,y2,z2) and (x3,y3,z3).

The centrifugal force F(t) applied to the model A is expressed by "m(k) * v(t)$^2$/r(t)". Where r(t) is a rotational radius and v(t) is a velocity at the time "t".

$$v(t)=\sqrt{[(x3-x2)^2+(y3-y2)^2+(z3-z2)^2]}$$

$$r(t)=\sqrt{[(ax-ox)^2+(ay-oy)^2]}$$

Where, $$ox=(ax*A+ay*D)*B-(bx*C+by*B)*D$$

$$oy=(bx*C+by*B)*A-(ax*A+ay*D)*C$$

Where,
A=ax−x1
B=by−y2
C=bx−x2
D=ay−y1
ax=(x1+x2)/2
ay=(y1+y2)/2
bx=(x2+x3)/2
by=(y2+y3)/2

As is obvious, the composite force of the centrifugal force F(t) and gravity G(t) are applied to the model so that the model and the graphic are inclined on the display. In this case, in order to simplify the explanation, it is assumed that the locus of the viewpoint is parallel to the ground level and the model is not accelerated in the Z-axis. Accordingly, the model is inclined only in the moving direction as shown on FIG. 4. The inclined angel θ is expressed as follows.

$$\theta=\arctan[K*v(t)^2/r(t)]$$

Where, K is a view-parameter which expresses an angle fluctuation proportional to the centrifugal force, and a kind of a spring constant η of the bar A. The inclining direction of the object is different in accordance with a state of restraint of the model. For example, when the model having the viewpoint is a vehicle which is restrained by the ground, the model is inclined in the direction of the centrifugal force as shown in FIG. 5B. On the other hand, when the model having the viewpoint is a train which is restrained by a railway, the centrifugal force and the reactive force are balanced as shown by FIG. 5A. The state of restraint has two states (types), i.e., a vehicle type and a train type, as explained above and shown in FIGS. 5A and 5B, and are previously stored in the viewpoint locus database 7.

Figure 6:
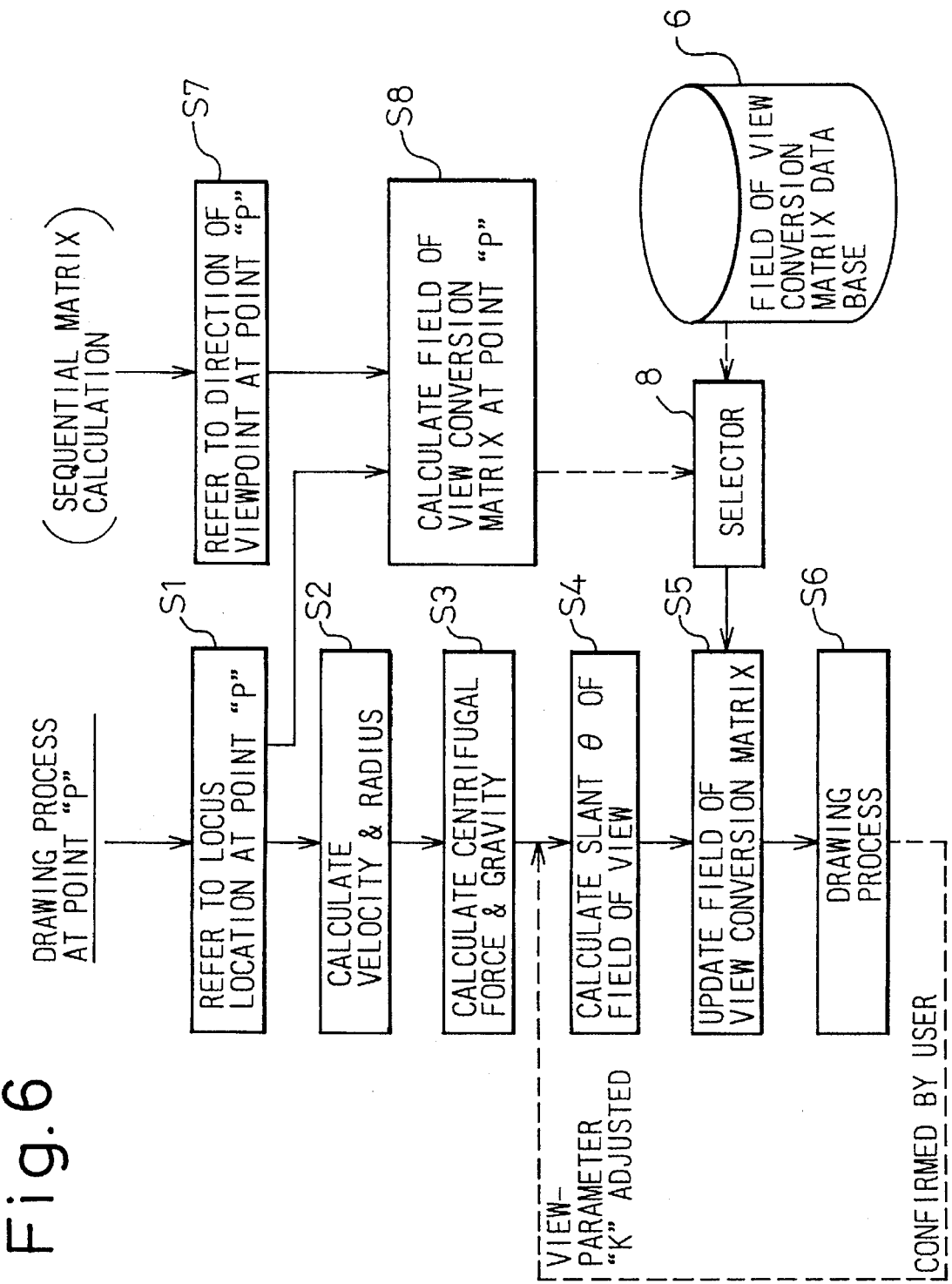
FIG. 6 is a basic process flowchart of a viewpoint setting apparatus according to the present invention.

FIG. 6 is a basic process flowchart of a viewpoint setting apparatus according to the present invention. In FIG. 6, the motion calculation unit 3 refers to the viewpoint locus database 7 to read the position of the locus at the point "p" (step S1), and calculates the velocity and rotational radius of the model at the time "t" (S2). Further, the motion calculation unit 3 calculates the centrifugal force and gravity applied to the object (S3), and calculates the slant angle θ (S4). The model is inclined by the composite force formed by the centrifugal force, the gravity, and the reactive force.

In the calculation of the slant angle θ, the angle θ is adjusted by the parameter K so as to become a visually real angle on the display by canceling an extreme centrifugal force. The parameter K is previously set in the viewpoint locus database 7.

The motion calculation unit 3 refers to the field of view conversion matrix database 6, calculates the field of view conversion matrix based on the field of view data at the slant angle θ, and updates the field of view conversion matrix (S5). The drawing processing unit 2 receives the field of view conversion matrix updated by the calculation unit 3, and displays the field of view at the time "t" on the monitor 1 (S6). When the drawing is not preferable, the view-parameter K is adjusted as shown by dotted line from the step S6 to the step S4. The slant angel θ is reflected in the field of view conversion matrix in accordance with the formulas (1) to (3). In FIG. 12, the slant angle θ is given by a rotation about the Z-axis (steps S7 and S8).

A selector 8 is provided for switching step 5 and step 8, i.e., calculation and update of the field of view conversion matrix. The steps S7 and S8 are provided for the sequential matrix calculation, and steps S1 to S6 are provided for the drawing process.

We claim:

1. A viewpoint setting apparatus for setting a viewpoint, provided on a three-dimensional model, on a display monitor in a computer graphics system, comprising:

a model information database storing three-dimensional model information including model coordinates and physical attributes thereof;

a viewpoint locus database storing viewpoint information including locus data produced when the viewpoint moves on the display monitor;

a field of view conversion matrix database storing a three-dimensional conversion matrix in order to change a field of view from the viewpoint;

motion calculation means operatively connected to said model information database, said viewpoint locus database, and said field of view conversion matrix database, for receiving the model information and the viewpoint information, calculating the motion of the model caused by the change of the field of view based on the change of the viewpoint which is caused by physical forces applied to the model having the viewpoint, and sequentially updating the field of view conversion matrix database in accordance with the change in the field of view calculated;

drawing processing means operatively connected to the motion calculation means, for receiving the result of calculation of the field of view conversion matrix from said motion calculation means, and drawing the three-dimensional model on the display monitor based on new field of view calculated by the motion calculation means; and input means operatively connected to the motion calculation means for outputting a view-parameter which adjusts the motion of the three-dimensional model so as to conform to an actual viewpoint of a user, wherein said three-dimensional model is formed by a bar-shaped model having a mass at the end thereof and a viewpoint at the top thereof.

2. A viewpoint setting apparatus as claimed in claim 1, wherein said motion calculation means calculates a composite force applied to the three-dimensional model of the physical forces which are defined by a centrifugal force, gravity and a reactive force in order to calculate a change in field of view.

3. A viewpoint setting apparatus as claims in claim 1, wherein said motion calculation means does not calculate the motion of the three-dimensional model when the viewpoint is not provided on the three-dimensional model.

4. A viewpoint setting apparatus as claimed in claim 1, wherein said field of view conversion matrix database includes two types of field of view conversion matrixes, including one field of view conversion matrix which does not include the influence of physical forces, and the other field of view conversion matrix which does include the influence of physical forces, the change of field of view being calculated based on the one matrix, and the matrix being corrected based on the influence of the physical forces in the other matrix.

5. A viewpoint setting apparatus as claimed in claim 1, wherein said view-parameter further adjusts the slant of the three-dimensional model to obtain a visually preferable viewpoint in accordance with the change in the field of view.

6. A viewpoint settling apparatus as claimed in claim 5, wherein said view-parameter is determined by a user after the user observes the three-dimensional model displayed on the monitor.

* * * * *